US012280484B2

(12) United States Patent
Varnum et al.

(10) Patent No.: US 12,280,484 B2
(45) Date of Patent: Apr. 22, 2025

(54) POST DRIVER

(71) Applicant: AOB Products Company, Columbia, MO (US)

(72) Inventors: Ryan Varnum, Columbia, MO (US); Timothy S. Kinney, Warrenton, MO (US); Seth Wheeler, Columbia, MO (US); Aaron Wood, Columbia, MO (US); James Tayon, Moberly, MO (US); Curtis Smith, Columbia, MO (US); Matthew Kinamore, Columbia, MO (US); Kyle Smith, Columbia, MO (US); Jason Nickerson, Columbia, MO (US); Bryan Mach, Columbia, MO (US); Eric Smith, Columbia, MO (US); Justin Murphy, Columbia, MO (US)

(73) Assignee: AOB Products Company, Columbia, MO (US)

( * ) Notice: Subject to any disclaimer, the term of this patent is extended or adjusted under 35 U.S.C. 154(b) by 78 days.

(21) Appl. No.: 17/444,967

(22) Filed: Aug. 12, 2021

(65) Prior Publication Data

US 2022/0048175 A1 Feb. 17, 2022

Related U.S. Application Data

(60) Provisional application No. 63/064,648, filed on Aug. 12, 2020.

(51) Int. Cl.

| | |
|---|---|
| ***B25D 1/16*** | (2006.01) |
| ***B25G 1/10*** | (2006.01) |
| ***E04H 17/26*** | (2006.01) |
| *B25G 1/01* | (2006.01) |

(52) U.S. Cl.
CPC ................. *B25D 1/16* (2013.01); *B25G 1/10* (2013.01); *E04H 17/263* (2013.01); *B25G 1/01* (2013.01)

(58) Field of Classification Search
CPC .. B25D 1/12; B25D 1/16; B25D 1/045; E02D 1/022; E02D 7/04; E02D 9/02; E04H 17/263; E04H 17/265; B25G 1/01; B25G 1/10; B25G 1/102
USPC ............. 173/90, 91, 162.1, 162.2, 210, 170; 81/20, 22
See application file for complete search history.

(56) References Cited

U.S. PATENT DOCUMENTS

| | | | | |
|---|---|---|---|---|
| 1,916,463 A | | 7/1933 | Carrel | |
| 2,098,146 A | | 11/1937 | Hunt | |
| 2,690,055 A | | 9/1954 | Lundgren et al. | |
| 3,115,199 A | | 12/1963 | Linabery | |
| 3,712,389 A | | 1/1973 | Smoak | |
| 3,792,739 A | * | 2/1974 | Deike | B25D 1/16 173/121 |
| 4,589,500 A | | 5/1986 | Moraly | |

(Continued)

*Primary Examiner* — Scott A Smith
(74) *Attorney, Agent, or Firm* — Stinson LLP

(57) ABSTRACT

A post driver for installing a post includes a post receiver. The post receiver has a post receiver body defining a post receiving space with an open end and an opposite closed end. The post receiving space is sized and shaped to receive an upper end portion of the post. The post receiver body has an outer surface. The post receiver includes a post receiver cover connected to the post receiver body and at least partially covering the outer surface of the post receiver body. A first handle is connected to the post receiver and a second handle is connected to the post receiver.

32 Claims, 5 Drawing Sheets

(56) References Cited

U.S. PATENT DOCUMENTS

| | | | | |
|---|---|---|---|---|
| 4,971,479 | A | 11/1990 | Byers, Sr. et al. | |
| 5,020,605 | A | 6/1991 | Leishman | |
| 5,029,651 | A | 7/1991 | Ubbink | |
| 5,262,113 | A * | 11/1993 | Carmien | B25G 1/10 264/317 |
| 5,397,130 | A | 3/1995 | Brown | |
| 5,462,126 | A | 10/1995 | Wallace | |
| 5,538,090 | A | 7/1996 | Siler | |
| 5,588,343 | A * | 12/1996 | Rust | B25G 1/102 81/22 |
| 5,806,453 | A | 9/1998 | Cook | |
| 6,364,031 | B1 | 4/2002 | Amicangelo | |
| 6,370,986 | B1 * | 4/2002 | Scott | B25G 1/01 81/22 |
| 6,571,885 | B2 | 6/2003 | Lee, Jr. et al. | |
| 6,595,087 | B2 * | 7/2003 | Whalen | B25G 1/01 81/22 |
| 6,619,408 | B1 * | 9/2003 | Lai | B25G 1/01 81/22 |
| 6,763,747 | B1 * | 7/2004 | Gierer | B25D 1/12 81/177.1 |
| 6,772,565 | B1 | 8/2004 | Schiltz et al. | |
| 7,117,955 | B2 * | 10/2006 | Rivers | E02D 7/04 173/171 |
| D587,548 | S | 3/2009 | O'Toole | |
| 7,555,870 | B1 | 7/2009 | Schiltz et al. | |
| 7,832,497 | B2 | 11/2010 | Wilson | |
| 7,837,177 | B2 | 11/2010 | McNeill | |
| 7,980,323 | B2 | 7/2011 | Wilson | |
| 8,047,099 | B2 * | 11/2011 | St. John | B25D 1/045 81/20 |
| D658,953 | S | 5/2012 | Wilson | |
| 8,230,944 | B2 | 7/2012 | Thiem | |
| 8,276,683 | B1 | 10/2012 | Roy | |
| D675,494 | S | 2/2013 | Beem | |
| 8,701,791 | B2 | 4/2014 | Page | |
| 8,955,612 | B2 | 2/2015 | O'Toole | |
| 9,051,705 | B1 | 6/2015 | Rose | |
| 9,181,726 | B2 | 11/2015 | McNeill | |
| 9,206,578 | B1 | 12/2015 | Rose | |
| D778,136 | S * | 2/2017 | Chen | D8/77 |
| D786,031 | S | 5/2017 | Whitten | |
| D829,517 | S | 10/2018 | Coleman | |
| D850,877 | S | 6/2019 | Zhang | |
| 10,364,590 | B1 | 7/2019 | Johnston | |
| D877,580 | S | 3/2020 | Dishman | |
| 2002/0139548 | A1 | 10/2002 | Connelly, Jr. | |
| 2007/0181320 | A1 | 8/2007 | Mason | |
| 2011/0049451 | A1 | 3/2011 | Thiem | |
| 2011/0108298 | A1 * | 5/2011 | Zhou | B25D 11/068 173/90 |
| 2012/0145425 | A1 | 6/2012 | Page | |
| 2018/0202188 | A1 | 7/2018 | Dishman | |
| 2019/0119948 | A1 | 4/2019 | Dishman | |
| 2020/0256079 | A1 | 8/2020 | McIntosh | |
| 2021/0047858 | A1 | 2/2021 | Castell et al. | |
| 2022/0049522 | A1 | 2/2022 | Varnum et al. | |
| 2023/0146723 | A1 | 5/2023 | Hochstetler | |

* cited by examiner

POST DRIVER

CROSS-REFERENCE TO RELATED APPLICATION

This application claims priority to U.S. Provisional Application No. 63/064,648, filed Aug. 12, 2020, the entirety of which is hereby incorporated by reference.

FIELD

The present disclosure generally relates to a post driver for the installation of posts and the like.

BACKGROUND

Post drivers are used to install posts by ramming or driving the posts into the ground. Generally, a user repeatedly hits the post into the ground with the post driver by lifting the post driver and then hitting the post with the post driver.

SUMMARY

In one aspect, a post driver for installing a post comprising a post receiver having a post receiver body defining a post receiving space having an open end and an opposite closed end. The post receiving space is sized and shaped to receive an upper end portion of the post. The post receiver body has an outer surface. The post receiver includes a post receiver cover connected to the post receiver body and at least partially covering the outer surface of the post receiver body. A first handle is connected to the post receiver and a second handle is connected to the post receiver.

In another aspect, a post driver for driving a post into the ground comprises a rigid framework having a post receiver body, a first handle body connected to the post receiver body, and a second handle body connected to the post receiver body. The post receiver body defines a post receiving space having an open end and an opposite closed end. The post receiving space is sized and shaped to receive an upper end portion of the post. A cover is molded on the rigid framework to conform to the rigid framework and covers at least a portion of the post receiver body, the first handle body, or the second handle body.

In another aspect, a method of making a post driver that drives a post into the ground comprises forming a rigid framework having a post receiver body, a first handle body and a second handle body. The post receiver body defines a post receiving space having an open end and an opposite closed end. The post receiving space is sized and shaped to receive an upper end portion of the post. The method also includes molding a cover onto the rigid framework. The cover covers at least a portion of the post receiver body, the first handle body or the second handle body.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
FIG. 1 is a rear perspective of a post driver according to one embodiment of the present disclosure.
Figure 2:
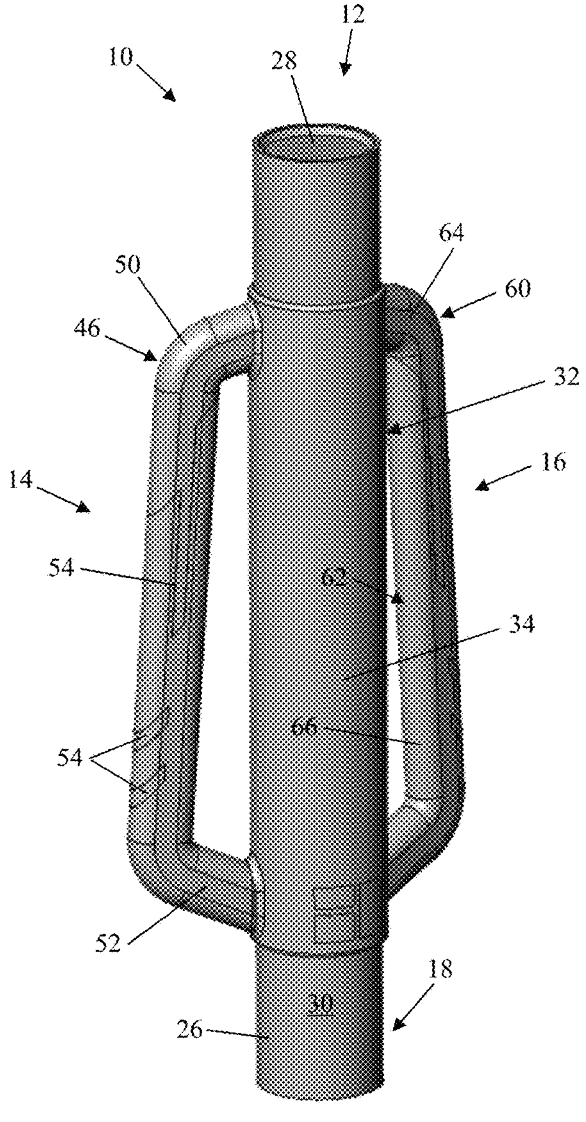
FIG. 2 is a front, left perspective of the post driver.
Figure 3:
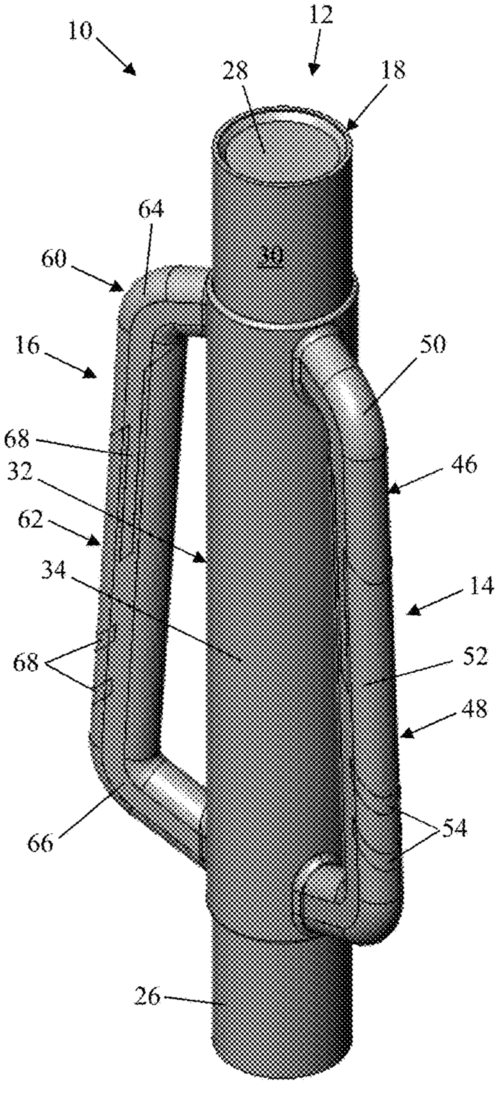
FIG. 3 is rear, left perspective of the post driver.

Referring to FIGS. 1-6, one embodiment of a post driver of the present disclosure is generally indicated by reference numeral 10. The post driver 10 is used to install a post, such as by driving the post (e.g., T-post) into the ground.

Figure 4:
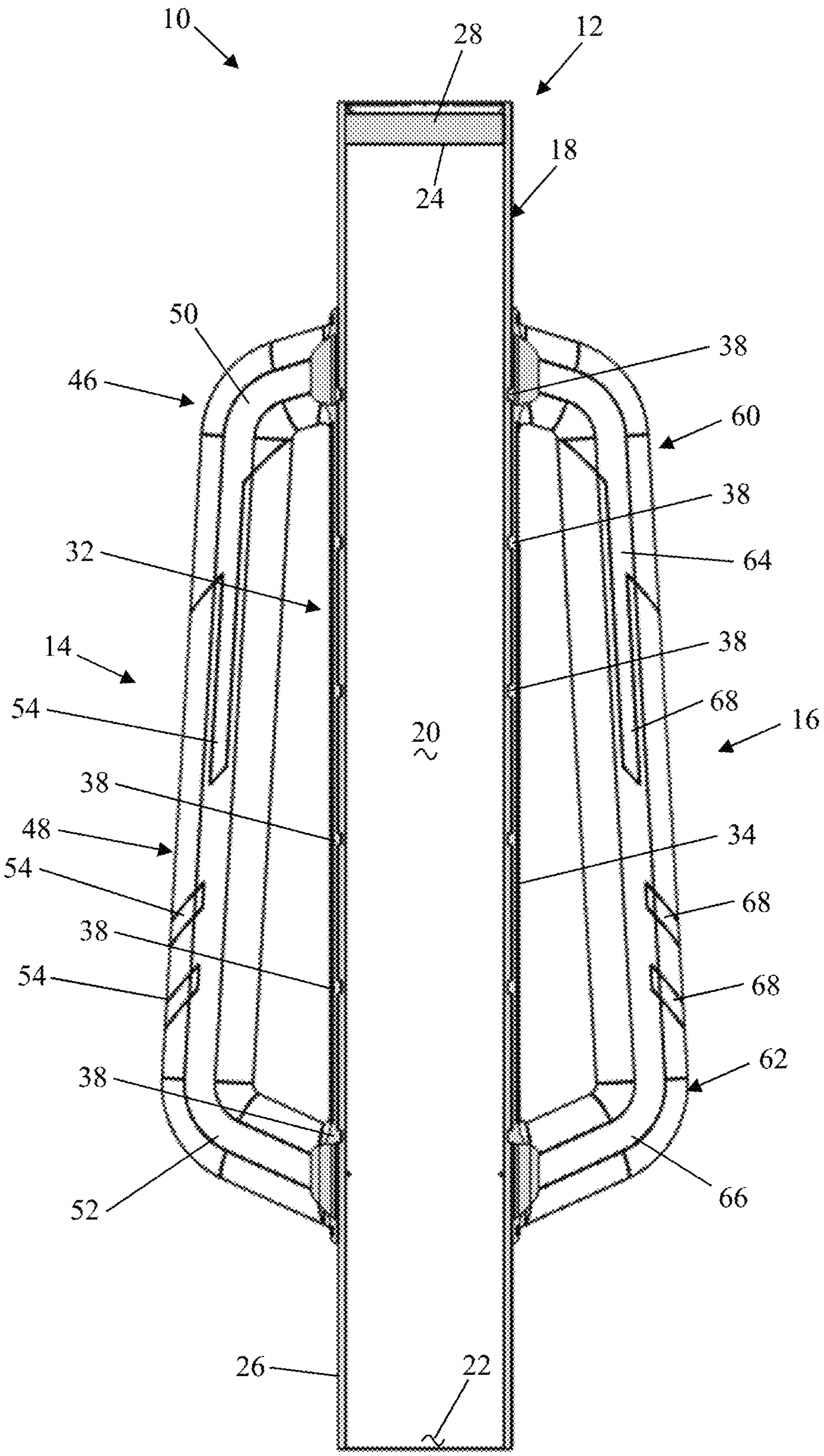
FIG. 4 is a cross-section of the post driver.

The post driver 10 includes a post receiver 12, a first handle 14 and a second handle 16. The first and second handles 14, 16 are connected to the post receiver 12. The first and second handles 14, 16 are connected to opposite sides of the post receiver 12. The post receiver 12 has a post receiver body 18. The post receiver body 18 defines a post receiving space 20 having an open end 22 and an opposite closed end 24 (FIG. 4). The post receiving space 20 is sized and shaped to receive an upper end portion of the post (not shown). In the illustrated embodiment, the post receiving space 20 is generally cylindrical. The post receiver body 18 includes a cylindrical wall 26 and an end cap 28 connected (e.g., securely fixed, such as by welding) to the cylindrical wall. The cylindrical wall 26 defines the post receiving space 20, with the end cap 28 defining the closed end 24 of the post receiving space. The post receiver body 18 includes an outer surface 30 (e.g., an outer surface of the cylindrical wall 26).

The post receiver 12 includes a post receiver cover 32. The post receiver cover 32 is connected to the post receiver body 18. Specifically, the post receiver cover 32 is mounted on the outer surface 30 of the post receiver body 18. The post receiver cover 32 at least partially covers the outer surface 30 of the post receiver body 18. In the illustrated embodiment, the post receiver cover 32 covers a portion of the outer surface 30. Desirably, the post receiver cover 32 covers a majority of the outer surface 30 to provide a secure connection between the post receiver cover and the post receiver body 18. The post receiver cover 32 has opposite first and second ends. The first end of the post receiver cover 32 is adjacent, but spaced apart from, a first end of the post receiver body 18, and the second end of the post receiver cover is adjacent, but spaced apart from, a second end of the post receiver body. For reasons that will become apparent, the first end of the post receiver cover 32 is disposed between the first end of the post receiver body 18 and a first connection location of the first and second handles 14, 16 with the post receiver body. Likewise, the second end of the post receiver cover 32 is disposed between the second end of the post receiver body 18 and a second connection location of the first and second handles 14, 16 with the post receiver body. In the illustrated embodiment, the first end of the post receiver cover 32 is adjacent the connection location between a first end of the first handle 14 (and a first end of the second handle 16) and the post receiver 12, and the second end of the post receiver cover is adjacent the connection location between a second end of the first handle (and a second end of the second handle) and the post receiver.

The post receiver cover 32 (e.g., an interior surface thereof) conforms to the size and shape of the post receiver body 18 (e.g., the outer surface 30). The post receiver cover 32 includes a cylindrical wall 34 that extends along the cylindrical wall 26 of the post receiver body 18. The cylindrical wall 34 defines a post receiver body receiving space 36 in which the post receiver body 18 is disposed.

To further enhance the connection of the post receiver cover 32 and the post receiver body 18, the post receiver cover and the post receiver body can be mated together (broadly, via "mating structure"). Desirably, one of the post receiver body 18 and the post receiver cover 32 includes a plurality of projections 38 (broadly, at least one projection) and the other of the post receiver body and the post receiver cover includes a plurality of recesses 40 (broadly, at least one recess). Each projection 38 is disposed in one of the recesses 40 to inhibit the post receiver body 18 and the post receiver cover 32 from moving (e.g. sliding) relative to each other. In the illustrated embodiment, the post receiver body 18 includes (e.g., defines) the recesses 40 and the post receiver cover 32 includes the projections 38. Alternatively, the post receiver body could include the projections and the post receiver cover could include the recesses, or the post receiver body and the post receiver cover could both include a combination of projections and recesses. The illustrated recesses 40 circumferentially extend around the cylindrical wall 26 of the post receiver body 18 and extend radially inward from the outer surface 30. The illustrated projections 38 comprise circumferential ribs extending radially inward from the inner surface of the cylindrical wall 34 of the post receiver cover 32.

Figure 5:
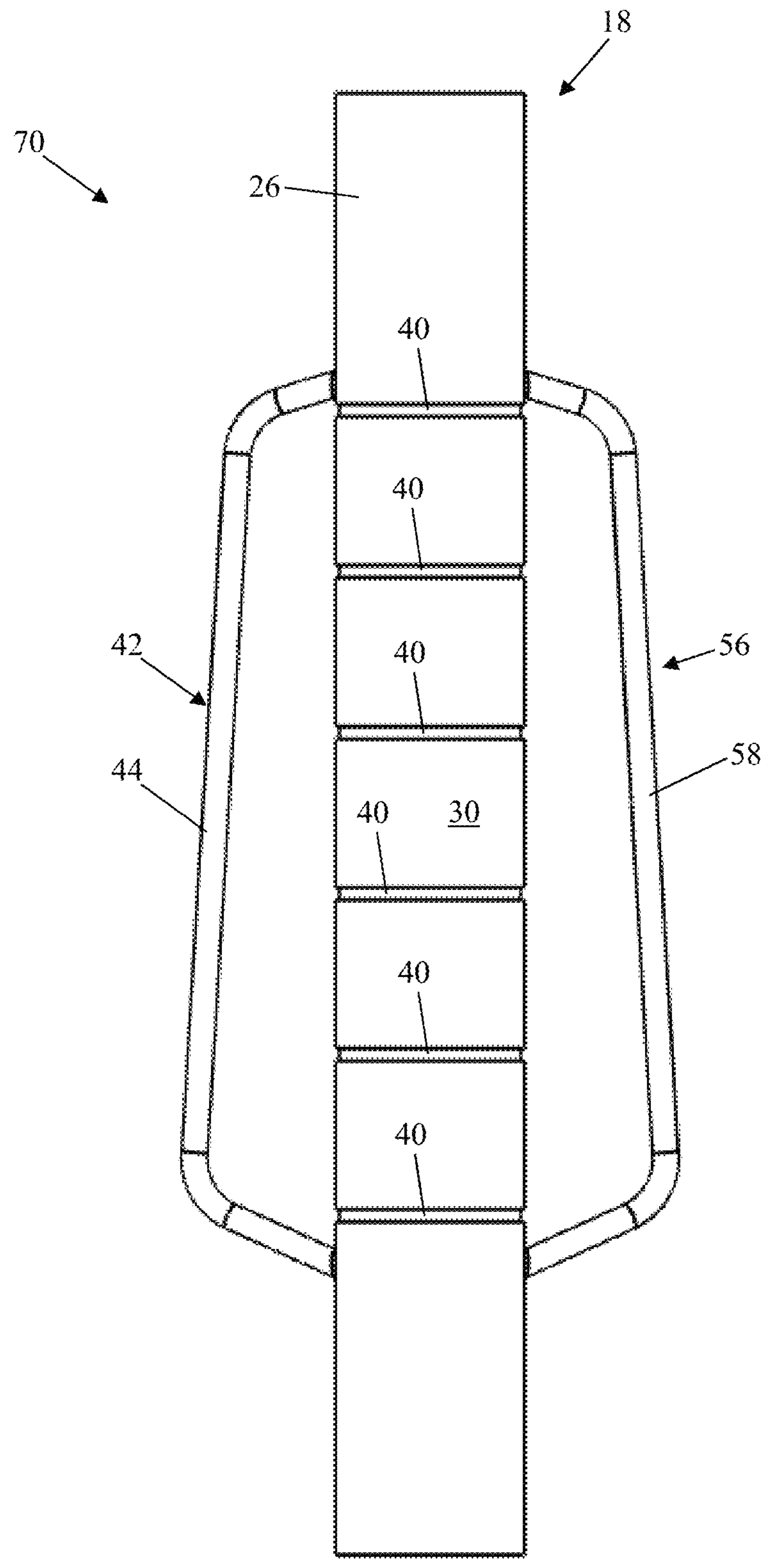
FIG. 5 is a front elevation of a rigid framework of the post driver.

The first handle 14 includes a first handle body 42 (FIG. 5). The first handle body 42 has opposite ends connected to the post receiver body 18. In the illustrated embodiment, the first handle body 42 is secured to the post receiver body 18, such as by welding. The first handle body 42 comprises a bent rod. The rod is bent in a generally U-shape, so as to space apart an intermediate section of the first handle body 42 from the post receiver body 18. The first handle body 42 has an outer surface 44. The first handle 14 includes a first handle cover 46. The first handle cover 46 is connected to the first handle body 42. Specifically, the first handle cover 46 is mounted on the outer surface 44 of the first handle body 42. The first handle cover 46 at least partially covers the outer surface 44 of the first handle body 42. In the illustrated embodiment, the first handle cover 46 covers the entirety of the outer surface 44 of the first handle body 42. This ensures a secure connection between the first handle cover 46 and the first handle body 42. The first handle cover 46 has opposite first and second ends. The first end of the first handle cover 46 is connected to the post receiver cover 32 (adjacent the first end of the post receiver cover). The second end of the first handle cover 46 is connected to the post receiver cover 32 (adjacent the second end of the post receiver cover). The first handle cover 46 (e.g., an interior surface thereof) conforms to the size and shape of the first handle body 42 (e.g., the outer surface 44). The first handle cover 46 defines a lumen therethrough in which the first handle body 42 is disposed. In one embodiment, the first handle 14 may not include the first handle body 42, such that the first handle cover 46 generally forms the first handle. In this embodiment, the first handle cover may still include the lumen or can be solid.

The first handle 14 also includes a first grip 48. The first grip 48 is connected to the first handle cover 46. Specifically, the first grip 48 is mounted on an outer surface of the first handle cover 46. The first grip 48 at least partially covers the first handle cover 46. In the illustrated embodiment, the first grip 48 covers a portion of the first handle cover 46. Desirably, the first grip 48 covers a majority of the first handle cover 46 to provide a large area for the user to grip and ensure a secure connection between the first grip and the first handle cover. In the illustrated embodiment, the first grip 48 extends along the first handle cover 46 from the second end of the first handle cover toward the first end. The first grip 48 does not extend all the way to the first end of the first handle cover 46, although in other embodiments the first grip may extend to the first end of the first handle cover. The first handle cover 46 includes an exterior surface 50 and the first grip 48 includes an exterior surface 52. The exterior surfaces 50, 52 of the first handle cover 46 and the first grip 48 are flush with one another. This provides a smooth transition between the first handle cover 46 and the first grip 48 to make it easy for a user to position their hand at generally any position on the first handle 14. The first grip 48 is generally recessed into the first handle cover 46 so that the exterior surfaces 50, 52 are flush with each other. The first grip 48 (e.g., an interior surface thereof) conforms to the size and shape of the first handle cover 46 (e.g., an outer surface thereof). The first grip 48 defines a lumen (not shown) therethrough in which the first handle cover 46 is disposed.

To further enhance the attachment between the first grip 48 and the first handle cover 46, the first grip and the first handle cover can be mated together. Desirably, one of the first grip 48 and the first handle cover 46 includes a plurality of projections 54 (broadly, at least one projection) and the other of the first grip and the first handle cover includes a plurality of recesses (broadly, at least one recess). Each projection 54 is disposed in one of the recesses to inhibit the first grip 48 and the first handle body 46 from moving (e.g., sliding) relative to each other. In the illustrated embodiment, the first grip 48 includes (e.g., defines) the recesses and the first handle cover 46 includes the projections 54. Alternatively, the first grip could include the projections and the first handle cover could include the recesses or the first grip and the first handle cover could both include a combination of projections and recesses. The illustrated recesses are openings or channels extending through the first grip 48. The illustrated projections 54 comprise ribs extending radially outward from the outer surface of the first handle cover 46. As mentioned above, the portion of the exterior surface 50 of the first handle cover 46 defined by the projections 54 are flush with the exterior surface 52 of the first grip 48, as illustrated.

Still referring to FIGS. 1-6, the second handle 16 is generally identical to the first handle 14 (e.g., is a mirror image thereof). The second handle 16 includes a second handle body 56 (FIG. 5). The second handle body 56 has opposite ends connected to the post receiver body 18. In the illustrated embodiment, the second handle body 56 is secured to the post receiver body 18, such as by welding. The second handle body 56 comprises a bent rod. The rod is bent in a generally U-shape, so as to space apart an intermediate section of the second handle body 56 from the post receiver body 18. The second handle body 56 has an outer surface 58. The second handle 16 includes a second handle cover 60. The second handle cover 60 is connected to the second handle body 56. Specifically, the second handle cover 60 is mounted on the outer surface 58 of the second handle body 56. The second handle cover 60 at least partially covers the outer surface 58 of the second handle body 56. In the illustrated embodiment, the second handle cover 60 covers the entirety of the outer surface 58 of the second handle body 56. This provides a secure connection between the second handle cover 60 and the second handle body 56. The second handle cover 60 has opposite first and second ends. The first end of the second handle cover 60 is connected to the post receiver cover 32 (adjacent the first end of the post receiver cover). The second end of the second handle cover 60 is connected to the post receiver cover 32 (adjacent the second end of the post receiver cover). The second handle cover 60 (e.g., an interior surface thereof) conforms to the size and shape of the second handle body 56 (e.g., the outer surface 58). The second handle cover 60 defines a lumen therethrough in which the second handle body 56 is disposed. In one embodiment, the second handle 16 may not include the second handle body 56, such that the second handle cover 60 generally forms the second handle. In this embodiment, the second handle cover may still include the lumen or can be solid.

The second handle 16 also includes a second grip 62. The second grip 62 is connected to the second handle cover 60. Specifically, the second grip 62 is mounted on an outer surface of the first handle cover 60. The second grip 62 at least partially covers the second handle cover 60. In the illustrated embodiment, the second grip 62 covers a portion of the second handle cover 60. Desirably, the second grip 62 covers a majority of the second handle cover 60 to provide a large area for the user to grip and ensure a secure connection between the second grip and the second handle cover. In the illustrated embodiment, the second grip 62 extends along the second handle cover 60 from the second end of the second handle cover toward the first end. The second grip 62 does not extend all the way to the first end of the second handle cover 60, although in other embodiments the second grip may extend to the first end of the second handle cover. The second handle cover 60 includes an exterior surface 64 and the second grip 62 includes an exterior surface 66. The exterior surfaces 64, 66 of the second handle cover 60 and the second grip 62 are flush with one another. This provides a smooth transition between the second handle cover 60 and the second grip 62 to make it easy for a user to position their hand at generally any position on the second handle 16. The second grip 62 is generally recessed into the second handle cover 60 so that the exterior surfaces 64, 66 are flush with each other. The second grip 62 (e.g., an interior surface thereof) conforms to the size and shape of the second handle cover 60 (e.g., an outer surface thereof). The second grip 62 defines a lumen (not shown) therethrough in which the second handle cover 60 is disposed.

To further enhance the attachment between the second grip 62 and the second handle cover 60, the second grip and the second handle cover can be mated together. Desirably, one of the second grip 62 and the second handle cover 60 includes a plurality of projections 68 (broadly, at least one projection) and the other of the second grip and the second handle cover includes a plurality of recesses (broadly, at least one recess). Each projection 68 is disposed in one of the recesses to inhibit the second grip 62 and the second handle body 60 from moving (e.g., sliding) relative to each other. In the illustrated embodiment, the second grip 62 includes (e.g., defines) the recesses and the second handle cover 60 includes the projections 68. Alternatively, the second grip could include the projections and the second handle cover could include the recesses or the second grip and the second handle cover could both include a combination of projections and recesses. The illustrated recesses are openings or channels extending through the second grip 62. The illustrated projections 68 comprise ribs extending radially outward from the outer surface of the second handle cover 60. As mentioned above, the portion of the exterior surface 64 of the second handle cover 60 defined by the projections 68 are flush with the exterior surface 66 of the second grip 62, as illustrated.

Referring to FIG. 5, the post receiver body 18, the first handle body 42 and the second handle body 56 form a framework 70 (e.g., a rigid framework) of the post driver 10. Generally, the description of the individual components of the framework 70 also apply to the framework. For example, the framework 70 defines the post receiving space 20. The framework 70 forms the rigid backbone of the post driver 10 that generally withstands the impact of repeatedly striking the post into the ground with the post driver. The framework 70 comprises a rigid material such as a metallic material (e.g., steel) or the like. The framework 70 may be a unitary, one-piece component or multiple pieces joined together, such as by welding.

Figure 6:
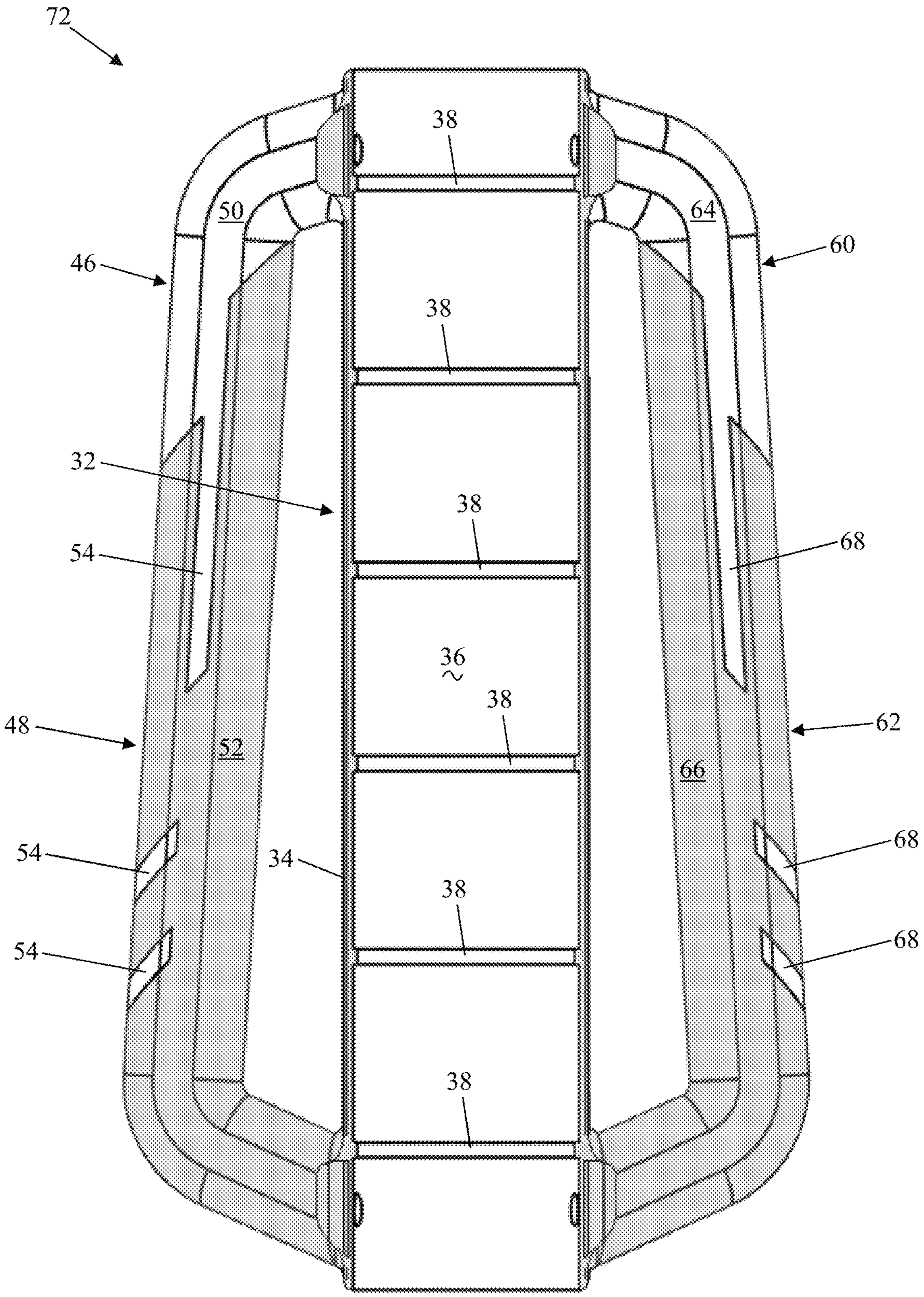
FIG. 6 is a cross-section of a cover of the post driver (the cross-sectional plane not extending through handles of the post driver), with grips on the handles of the post driver shown shaded for easier identification.

Referring to FIG. 6, the post receiver cover 32, the first handle cover 46 and the second handle cover 60 form a cover 72 (e.g., a framework cover) of the post driver 10. Generally, the description of the individual components of the cover 72 (e.g., the post receiver cover 32, the first handle cover 46 and the second handle cover 60) also apply to the cover. For example, the cover 72 is connected to (e.g., mounted on) the framework 70 and covers at least a portion of the post receiver cover 32, the first handle cover 46 and the second handle cover 60.

The cover 72, in combination with the first and second grips 48, 62, provides better grip, comfort, and impact dampening properties than conventional post drivers with metal handles. In other words, the cover 72 and first and second grips 48, 62, provide impact dampening to lessen the force of each impact against the post felt by the user as the post driver 10 repeatedly strikes the post. In the illustrated embodiment, the cover 72 is a unitary, one-piece component (e.g., the post receiver cover 32, the first handle cover 46 and the second handle cover 60 are a unitary, one-piece component). Such a construction of the cover 72 provides a secure connection to the framework 70 to inhibit the cover from moving relative to the framework, such as due to each strike of the post driver 10 against the post. In other embodiments, the cover 46 may be multiple pieces joined together, such as by welding or adhesive. Desirably, the cover 72 comprises a polymeric material such as nylon, plastic or the like. Broadly, the framework 70 (e.g., the post receiver body 18, the first handle body 42 and the second handle body 56) comprise a first material (e.g., a metallic material) and the cover 72 (e.g., the post receiver cover 32, the first handle cover 46 and the second handle cover 60) comprise a second material (e.g., a polymeric material, such as a resiliently compressible polymeric material) that is different from the first material. The first material of the framework 70 is able to withstand the repeated impacts against the post while the second material of the cover 72, desirably, dampens the force of each impact felt by the user. The first and second grips 48, 62 may be made of any suitable material such as thermoplastic elastomer, plastic (e.g., polyvinyl chloride), fabric, silicone, rubber, etc. (broadly, a third material that may be different than the first and/or second materials).

A method of making the post driver 10 will now described. First, the framework 70 is formed. In one example, a metal tube can but cut to length and then a metal end cap 28 is welded or otherwise attached to form the post receiver body 18. Metal rods can be cut and bent to shape and then welded or otherwise attached to the post receiver body 18 to form the first and second handle bodies 42, 56. After the framework 70 is formed, the cover 72 can be connected to (e.g., mounted on) the framework. In one embodiment, connecting the cover 72 to the framework 70 also includes forming the cover. For example, in one embodiment, the cover 72 is molded, such as by injection molding, onto the framework 70. The cover 72 is molded (e.g., injection molded) over the post receiver body 18 and the first and second handle bodies 42, 56. The framework 70 can be placed in a mold (not shown) and then material flows into the mold to form the cover 72. During the molding, the material forming the cover 72 fills the recesses 40 on the framework 70 to secure the cover in position on the framework. Molding the cover 72 onto the framework 70 forms a unitary, one-piece cover that conforms to the shape of the framework (e.g., hugs or surrounds the framework) to secure the cover on the framework. After the cover 72 is molded onto the framework 70, the first and second grips 48, 62 can be molded (e.g., overmolded) onto the cover. The first grip 48 is molded onto the portion of the cover 72 (e.g., the first handle cover 46) covering the first handle body 42. Similarly, the second grip 62 is molded onto the portion of the cover 72 (e.g., the second handle cover 62) covering the second handle body 56. The first and second grips 48, 62 can be molded at the same time or one after another.

Other ways of making the post driver 10 are within the scope of the present disclosure. For example, in one embodiment the cover 72 may be formed in two or more pieces, such as by injection molding, separate from the framework 70 and then mounted on the framework. In this embodiment, the two or more pieces of the cover 72 can be clamshell pieces that are applied on the framework 70 and coupled together. In this embodiment, the first and second grips 48, 62 can be molded onto one or more of the pieces before or after the pieces are mounted on the framework 70.

In operation, a bottom end or tip of the post is positioned where the user desires to drive the post into the ground. The upper end portion of the post is positioned in the post receiving space 20 by inserting the upper end of the post through the open end 22 of the post receiving space. While the upper end portion of the post is within the post receiver 12 (e.g. in the post receiving space 20), the user, grasping the first and second handles 14, 16, moves the post driver 10 upward and downward repeatedly to repeatedly strike the upper end of the post with the closed end 24 of the post receiving space 20 (broadly, the post receiver 12) to drive the post into the ground. As the post driver 10 is moved up and down, the user keeps the upper end portion of the post within the post receiving space 20 to guide and balance the post as the post is driven into the ground.

Securely attaching the cover 72 to the framework 70, as described herein (e.g., such as by using projections 38 and recesses 40), inhibits the cover from moving relative to the framework as the post driver 10 is repeatedly used to strike the post into the ground. Likewise, securely attaching the first and second grips 48, 62 to the cover 72, as described herein (e.g., such as by using projections 54, 68 and recesses), inhibits the first and second grips from moving relative to the cover as the post driver 10 is repeatedly used to strike the post into the ground.

When introducing elements of the present disclosure or the preferred embodiments(s) thereof, the articles “a”, “an”, “the” and “said” are intended to mean that there are one or more of the elements. The terms “comprising”, “including” and “having” are intended to be inclusive and mean that there may be additional elements other than the listed elements.

It will be apparent that modifications and variations are possible without departing from the scope defined in the appended claims.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A post driver for installing a post, the post driver comprising:

a post receiver having a post receiver body defining a post receiving space having an open end and an opposite driving end, the post receiving space sized and shaped to receive an upper end portion of the post, the post receiver body having an outer surface, the post receiver including a molded post receiver cover connected to the post receiver body and at least partially covering the outer surface of the post receiver body;

a first handle connected to the post receiver, the first handle including a first handle body, a first molded handle cover, and a first grip, the first molded handle cover covering at least a portion of the first handle body, the first grip being molded on and engaged with the first molded handle cover, the first grip and the first molded handle cover arranged to be grasped by one hand of a user; and a second handle connected to the post receiver, the second handle including a second handle body, a second molded handle cover, and a second grip, the second molded handle cover covering at least a portion of the second handle body, the second grip being molded on and engaged with the second molded handle cover, the second grip and the second molded handle cover arranged to be grasped by another hand of the user;

the first molded handle cover being directly connected to the molded post receiver cover and the second molded handle cover being directly connected to the molded post receiver cover.

2. The post driver of claim 1, wherein the first handle body is directly connected to the post receiver body.

3. The post driver of claim 2, wherein the second handle body is directly connected to the post receiver body.

4. The post driver of claim 3, wherein the first handle cover covers the entirety of an outer surface of the first handle body and the second handle cover overs an entirety of the outer surface of the second handle body.

5. The post driver of claim 3, wherein the post receiver cover, the first handle cover and the second handle cover are a unitary, one-piece component.

6. The post driver of claim 1, wherein the post receiver cover covers a majority of the outer surface of the post receiver body.

7. The post driver of claim 6, wherein the post receiver cover has opposite first and second ends, the first end adjacent the connection location between a first end of the first handle and the post receiver and the second end adjacent the connection location between a second end of the first handle and the post receiver.

8. The post driver of claim 1, wherein one of the post receiver body and the post receiver cover includes a plurality of projections and the other of the post receiver body and the post receiver cover includes a plurality of recesses, each projection disposed in one of the recesses to inhibit the post receiver body and the post receiver cover from moving relative to each other.

9. The post driver of claim 8, wherein the post receiver body includes the recesses and the post receiver cover includes the projections.

10. The post driver of claim 9, wherein each recess comprises a groove extending in a circumferential direction around the post receiver body and each projection comprises a rib.

11. The post driver of claim 1, wherein the first handle cover includes an exterior surface and the first grip includes an exterior surface, the exterior surfaces of the first handle cover and the first grip being flush with one another and being arranged to be grasped by a hand of the user.

12. The post driver of claim 11, wherein one of the first grip and the first handle cover includes a plurality of projections and the other of the first grip and the first handle cover includes a plurality of recesses, each projection disposed in one of the recesses to inhibit the first grip and the first handle cover from moving relative to each other.

13. The post driver of claim 12, wherein the second handle cover includes an exterior surface and the second grip includes an exterior surface, the exterior surfaces of the second handle cover and the second grip being flush with one another and being arranged to be grasped by another hand of the user.

14. The post driver of claim 13, wherein one of the second grip and the second handle cover includes a plurality of projections and the other of the second grip and the second handle cover includes a plurality of recesses, each projection disposed in one of the recesses to inhibit the second grip and the second handle cover from moving relative to each other.

15. The post driver of claim 1, wherein the post receiver cover comprises a first material and the post receiver body comprises a second material different than the first material.

16. The post driver of claim 1, wherein the first material comprises a polymeric material and the second material comprises a metallic material.

17. The post driver of claim 1, wherein the outer surface of the post receiver body includes surface segments not covered by the post receiver cover.

18. The post driver of claim 17, wherein the post receiver body has opposite first and second ends, the open end of the post receiving space being at the first end of the post receiver body, the post receiver cover being spaced toward the second end away from the first end of the post receiver body.

19. The post driver of claim 18, wherein the post receiver cover is spaced apart from the second end of the post receiver body.

20. The post driver of claim 1, wherein the first handle body includes a first bend, the first handle cover surrounding the first bend.

21. The post driver of claim 20, wherein the first grip surrounding the first handle cover at the first bend of the first handle body.

22. The post driver of claim 1, wherein the molded post receiver cover, the first molded handle cover, and the second molded handle cover are a unitary, one-piece component.

23. The post driver of claim 1, wherein:

one of the post receiver body and the molded post receiver cover includes a first projection and the other of the post receiver body and the post receiver cover includes a first recess, the first projection being disposed in the first recess to inhibit the post receiver body and the post receiver cover from moving relative to each other;

one of the first grip and the first molded handle cover includes a second projection and the other of the first grip and the first molded handle cover includes a second recess, the second projection being disposed in the second recess to inhibit the first grip and the first molded handle cover from moving relative to each other; and one of the second grip and the second molded handle cover includes a third projection and the other of the second grip and the second molded handle cover includes a third recess, the third projection being disposed in the third recess to inhibit the second grip and the second molded handle cover from moving relative to each other.

24. A post driver for driving a post into the ground, the post driver comprising:

a rigid framework having a post receiver body, a first handle body connected to the post receiver body, and a second handle body connected to the post receiver body, the post receiver body defining a post receiving space having an open end and an opposite driving end, the post receiving space sized and shaped to receive an upper end portion of the post; and a cover molded on and engaged with the rigid framework to conform to the rigid framework, the cover covering at least a portion of the post receiver body, the first handle body, and the second handle body;

a first grip molded on and engaged with said portion of the cover that covers the first handle body, the first grip and said portion of the cover that covers the first handle body arranged to be grasped by one hand of a user; and a second grip molded on and engaged with said portion of the cover that covers the second handle body, the second grip and said portion of the cover that covers the second handle body arranged to be grasped by another hand of the user.

25. The post driver of claim 24, wherein:

one of the post receiver body and the cover includes a first projection and the other of the post receiver body and the cover includes a first recess, the first projection being disposed in the first recess to inhibit the post receiver body and the cover from moving relative to each other;

one of the first grip and said portion of the cover that covers the first handle body includes a second projection and the other of the first grip and said portion of the cover that covers the first handle body includes a second recess, the second projection being disposed in the second recess to inhibit the first grip and said portion of the cover that covers the first handle body from moving relative to each other; and one of the second grip and said portion of the cover that covers the second handle body includes a third projection and the other of the second grip and said portion of the cover that covers the second handle body includes a third recess, the third projection being disposed in the third recess to inhibit the second grip and said portion of the cover that covers the second handle body from moving relative to each other.

26. The post driver of claim 24, wherein one of the post receiver body and the molded post receiver cover includes a projection and the other of the post receiver body and the post receiver cover includes a recess, the projection being disposed in the recess to inhibit the post receiver body and the post receiver cover from moving relative to each other.

27. The post driver of claim 24, wherein one of the first grip and the first molded handle cover includes a first projection and the other of the first grip and the first molded handle cover includes a first recess, the first projection being disposed in the first recess to inhibit the first grip and the first molded handle cover from moving relative to each other.

28. The post driver of claim 27, wherein one of the second grip and the second molded handle cover includes a second projection and the other of the second grip and the second molded handle cover includes a second recess, the second projection being disposed in the second recess to inhibit the second grip and the second molded handle cover from moving relative to each other.

29. The post driver of claim 24, wherein the cover covers the entirety of the first handle body and the second handle body.

30. The post driver of claim 24, wherein the cover includes an exterior surface, the first grip includes an exterior surface, and the second grip includes an exterior surface, the exterior surface of the cover being flush with the exterior surfaces of the first and second grips, the exterior surfaces of the cover, the first grip, and the second grip being arranged to be grasped by the user.

31. The post driver of claim 24, wherein the first handle body includes a first bend and the second handle body includes a second bend, the cover surrounding the first and second bends.

32. The post driver of claim 24, wherein the cover covers a first connection between the first handle body and the post receiver body and covers a second connection between the second handle body and the post receiver body.

* * * * *